United States Patent Office 3,470,759
Patented Oct. 7, 1969

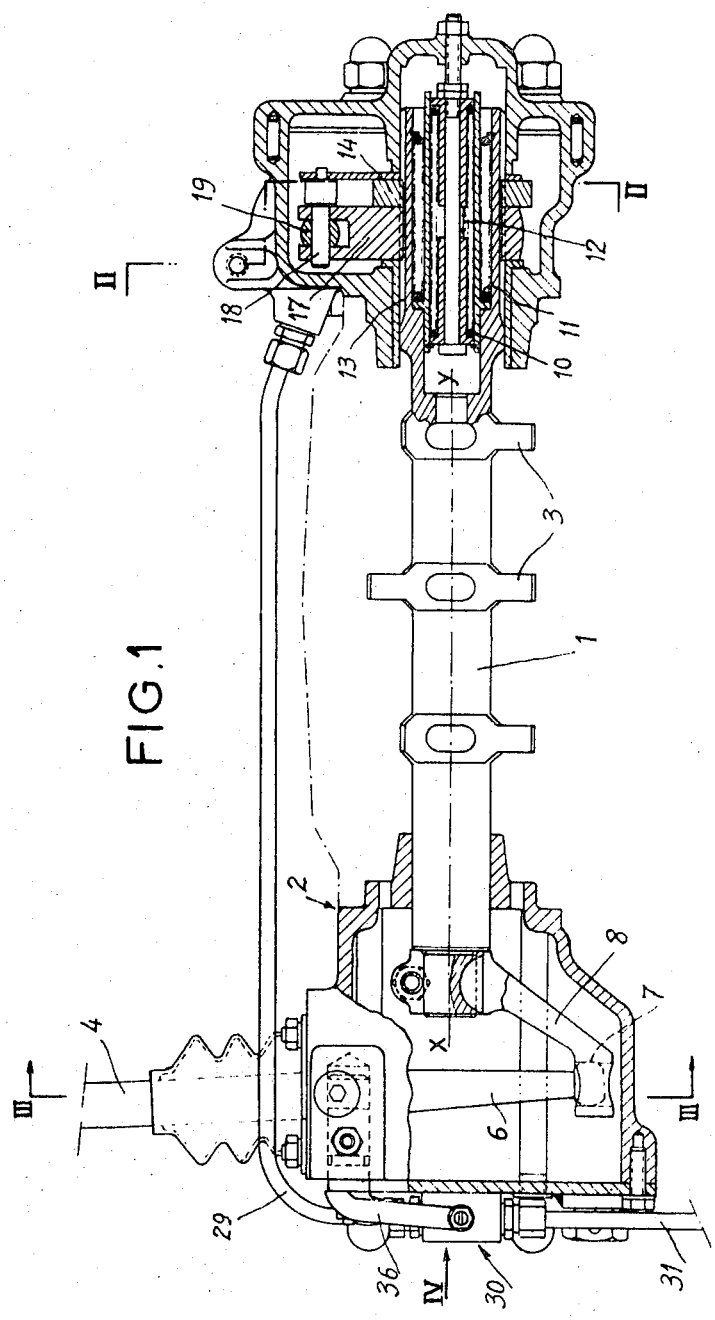

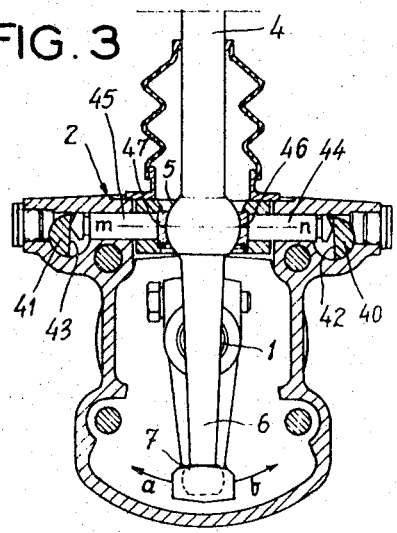
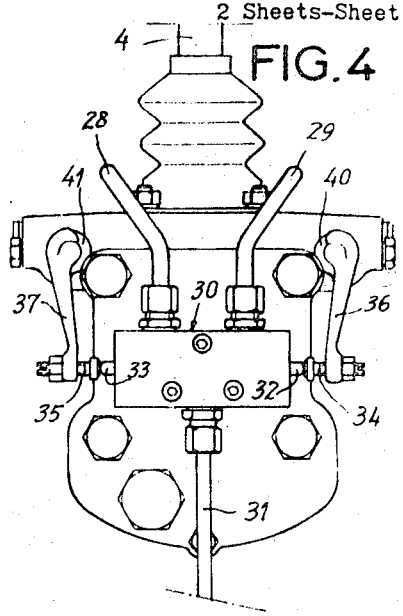
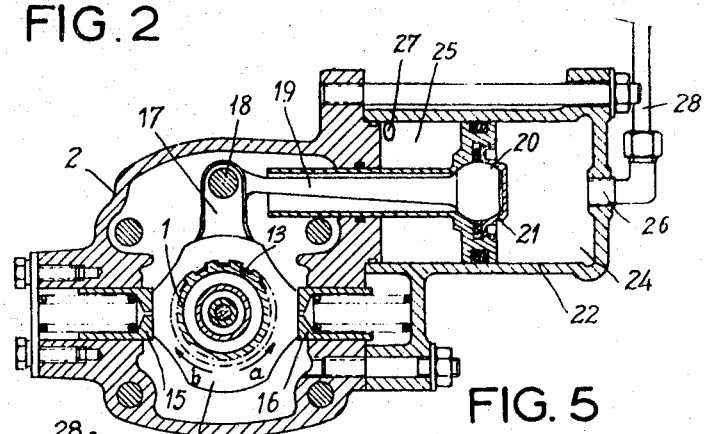
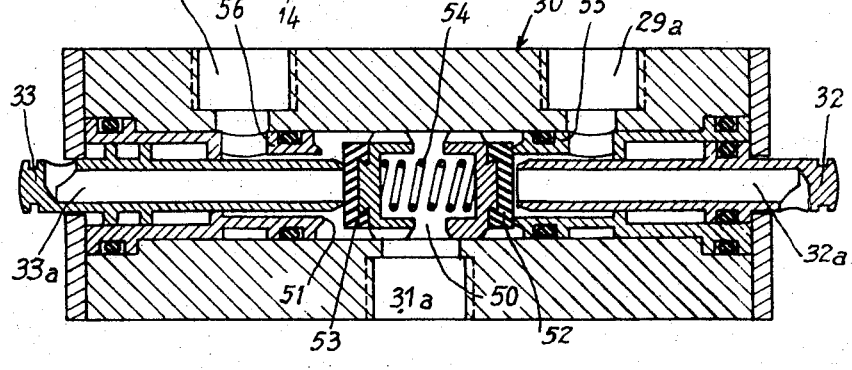

3,470,759
POWER-ASSISTED CHANGE-SPEED DEVICES
Pierre Labat, Suresnes, France, assignor to Societe Anonyme de Vehicules Industriels et d'Equipements Mecaniques, SAVIEM, Suresnes, Hauts-de-Seine, France
Filed Mar. 10, 1967, Ser. No. 622,341
Claims priority, application France, Mar. 24, 1966, 54,870
Int. Cl. G05g 9/14, 13/04
U.S. Cl. 74—473                                    4 Claims

ABSTRACT OF THE DISCLOSURE

Power-assisted change-speed device for a transmission mechanism providing a plurality of gear ratios engageable at will, which comprises a gear selector adapted to perform a given guided selection movement and a given guided movement for engaging the gear ratios of the transmission mechanism, a manual control change-speed lever, a power-assistance device connected to said selector, and means for releasing said power assistance device which are responsive to said manual control change-speed lever. (Refer to FIGURE 1.)

---

This invention relates to a power-assisted change-speed device for a transmission mechanism providing a plurality of gear ratios or speeds engageable at will by means of a manual control lever. The original feature of this invention resides notably in a specific arrangement of the device whereby a power assistance is added to the manual effort demanded as a rule by the effective engagement of the gear ratios, while preserving a mechanical connection of conventional type between said control lever and the selector performing the change to the selected ratio, whereby the change-speed mechanism can be actuated under all circumstances even in case of failure of the power-assistance means.

More particularly, the power-assisted change-speed device of this invention for a transmission mechanism providing a plurality of gear ratios engageable at will, comprising a speed selector having a given guided selection movement and a given guided movement for engaging the gear ratios of the mechanism, a manual control change-speed lever, a power-assistance device associated with said selector, and means for releasing said power-assistance device which are responsive to said manual control lever, is characterised in that there is provided, between said lever and said selector, a link including a resiliently free mounting so directed as to be responsive to the reaction of the control effort necessary to produce the directed movement of the selector when engaging the gear ratios, this resiliently free mounting co-acting with said power-assistance release means for actuating said means when the manual control effort exerted on said lever exceeds a predetermined value.

A typical form of embodiment of this invention is described hereinafter by way of example with reference to the accompanying drawings, in which:

FIGURE 1 is a general view of a change-speed device according to this invention, shown in partial section taken along the longitudinal axis of the selector;

FIGURE 2 is a sectional view of the same device, the section being taken along the line II—II of FIGURE 1;

FIGURE 3 is a section taken along the line III—III of FIGURE 1;

FIGURE 4 is an end view of the device as seen in the direction of the arrow IV of FIGURE 1;

FIGURE 5 is an axial section showing a pressure-fluid distributor incorporated in the device of this invention.

Of the change-speed device illustrated in the drawings, only the parts essential to the proper understanding of this invention are shown, that is, the control of a speed selector consisting in this example of a shaft 1 adapted to slide and rotate in the gear case portion 2 or a transmission mechanism of the sliding-hub type (not shown). This shaft 1 carries elements 3 adapted to coact with component elements of the change-speed mechanism so that, according to the current practice, the translation of shaft 1 along the axis $x$–$y$ permits of selecting through these elements at least one gear ratio, the rotation of this shaft about its axis in one or the other direction (see arrows $a$ or $b$, FIGURE 2) ensuring the actual engagement of the selected gear ratio. It will be seen for example that the aforesaid elements 3 coact with conventional members for controlling the sliding hubs of the change-speed mechanism (not shown). More particularly, a control system of this character is described in the patent application Ser. No. 615,726 filed on Feb. 13, 1967.

In this arrangement, the power assistance is applied to the movement necesary for producing the engagement of a gear ratio (arrow $a$ or $b$), according to the manual effort demanded by the gear lever 4 mechanically connected to the selector 1 so as to be capable of imparting the necessary selection movements (along the axis $x$–$y$) and speed-engaging movements (arrow $a$ or $b$). This lever 4 is of the ball-joint type mounted in the gear case section 2 with a certain resilient liberty or lost-motion, as will be explained presently, and comprises a control arm 6 having its ball-shaped lower end mounted in a corresponding socket 7 formed in an arm 8 keyed on the selector shaft 1, whereby movements of translation and movements of rotation can be imparted to this shaft by means of the control lever 4. This lever 4 or the shaft 1 (in a manner not shown in the drawings) may be provided with guide means of the conventional gate type, wherein the neutral line corresponds to the movement of shaft 1 in the direction of the axis $x$–$y$. In this example the shaft 1 has its end remote from the lever 4 responsive to a return and axial positioning system comprising concentric springs 10, 11 disposed in the shaft end and urging same in the direction $x$–$y$ to the mean position illustrated in the drawing. As this return and positioning device is no part of ths invention, it can be considered as optional in this case, and any further description thereof will be omitted as its illustration in FIGURE 1 is clear enough to afford a proper understanding, spring 10 being weaker than spring 11 and acting as a return spring in either direction for the permissible stroke 12 between the spring bearing caps, the other spring 11 permitting if necessary a longer stroke of shaft 1 to the left as seen in the figure.

Moreover, shaft 1 has this same end portion responsive to a device adapted resiliently to urge it to its neutral angular position, but this device is also optional as far as the present invention is concerned; finally, a rotation assistance device illustrated in FIGURES 1 and 2 also acts upon this shaft 1.

The corresponding end of shaft 1 has external splines 13 formed thereon which slidably engage the internal splines of an angular holding cam 14 responsive to spring-loaded followers 15, 16, and the internal splines of a crank 17 pivotally connected at 18 to a control rod 19. This control rod 19 which is driven by a power drive means comprising the air distributor 30 and cylinder 22 has at its other end a part-spherical configuration engaged in the piston 21 of a double-acting cylinder (in this case a pneumatic cylinder) of which the body 22 is divided by the piston 21 and the hollow piston-rod into two fluid-tight chambers 24 and 25 adapted to be supplied with compressed air through ports 26 and 27 connected by means of separate pipe lines 28 and 29 to a compressed air distributor 30 connected to a source of compressed air through another pipe line 31. This distributor 30 is of a type adapted in the inoperative position to connect both chambers 24 and 25 to the exhaust, and to pressurize one or the other chamber according as one or the other control rods 32 and 33 of the movable system of the distributor (see FIGURE 4). Under these conditions, the distributor 30 may be designed in various manners, FIGURE 5 illustrating only a typical form of embodiment thereof.

The distributor body has tapped ports 28a, 29a and 31a formed therein for connecting the device to pipe lines 28, 29 and 31 respectively. Port 31a opens into a central distribution chamber 50 between two spring-loaded valves 52, 53 disposed between the control rods 32, 33 with which they are adapted to coact and towards which they are urged by a compression spring 54, as shown.

In the inoperative position of the distributor (right-hand half of FIGURE 5) the right-hand valve 52 engages the seat formed at the inner end of a tubular insert 55 constantly communicating with port 29a and in which the aforesaid control rod 32 is slidably mounted, this control rod 32 being formed in turn with an inner passage 32a which in this case will normally vent to the atmosphere the distributor chamber connected to said port 29a.

The other valve 53 coacts similarly with the seat of a tubular insert 56 constantly communicating with port 28a, and its control rod 33 is also formed with an inner passage 33a for venting to the atmosphere the other chamber of the distributor which is connected to port 28a.

As illustrated in the left-hand portion of FIGURE 5, when the control rod 33 is moved inwards and pushes the valve 53 against the resistance of spring 54, a first consequence of this movement is that the venting passage 33a is closed and that the communication between the distribution chamber 50 and port 28a is established through the open seat of insert 56; in other words, the chamber 24 of the pneumatic actuator or cylinder 22 will be supplied with compressed air, and kept under this condition until the force urging the control rod 32 inwards is discontinued.

Coacting with said control rods 32, 33 are bearing pins 34, 35 adjustably mounted on the free ends of a pair of opposite arms 36, 37 pivotally mounted on the gear case section 2 by means of pivot pins 40 and 41 respectively. These pins 40 and 41 are formed with flat faces 42, 43 (see FIGURE 3) engaged at an eccentric point by corresponding push-rods 44 and 45 bearing with their opposite ends against a pair of shoes 46, 47 having part-spherical faces in constant sliding engagement with the ball-shaped end 5 of lever 4.

This part-spherical socket or bearing of the ball-shaped end 5 is thus movable along the axis $x$–$y$ of push-rods 44, 45, and elastically due to the connection between these rods and the return spring 54 provided internally of the distributor 30. Thus, this distributor will control the effort from which the bearing of the ball-shaped end 5 of lever 4 is caused to move in the direction of the axis $m$–$n$ as a reaction to the effort to be applied at 7 to the control arm 6 of lever 4 for rotating the selector shaft 1 when engaging a gear ratio (arrow $a$ or $b$).

It is clear that above a predetermined reaction effort exerted on the ball-shaped portion 5 the distributor 30 will be actuated in one or the other direction, thus delivering compressed air through pipe line 28 or 29 into one or the other chamber 24 or 25 of cylinder 22, and producing the desired power-assistance during the selector control movement. This power-assistance will cease automatically when the distributor resumes its inoperative condition, that is, when the manual effort to be exerted on the lever 4 becomes inferior to that corresponding to the predetermined reaction effort necessary for moving the ball-shaped portion 5 of lever 4.

It will be noted that the selector movement corresponding to the displacement of the selector shaft 1 along the axis $x$–$y$ requires practically no assistance, but even if an unexpected effort had to be exerted therefor on the lever 4, this effort would correspond to a reaction on the ball-shaped portion 5 in a direction across the axis $m$–$n$ of the push-rods, and therefore without any effect on the distributor and cylinder assisting in the selector rotation. In fact, the part-spherical bearing of the intermediate ball-shaped portion 5 can move slightly only in the direction of said axis $m$–$n$.

Of course, this invention is applicable as well to a change-speed mechanism wherein the selector movement would correspond to a rotational movement of the selector member, and the speed engagement movement to a movement of translation of this selector member, which would then become the power-assisted movement.

Besides, it will be readily understood that this invention should not be construed as being limited, for detecting the speed engagement reaction effort, to the use of a lever mounted in a ball-and-socket bearing as shown herein by way of example, for any guided and resiliently free mounting may be provided between the manual change-speed control lever and the member to be controlled, this resiliently free mounting being disposed if desired directly between the manual control lever and the movable control member associated therewith.

I claim:

1. A multi-speed power transmission means including a power-assist device for a manually shiftable speed selector shaft in said transmission means, said device comprising: a selectively actuable power drive means for shifting a said speed selector shaft in either of opposite directions from a pre-established neutral position, control means for said drive means, said control means being responsive to manual shifting of said speed selector shaft in either of said directions to actuate said drive means to shift said shaft in a said direction corresponding to that in which it is being shifted by manual means, said multi-speed transmission means comprising an axially and rotatively shiftable speed-selector shaft and a manually operable gear shift level connected to said shaft for selectively shifting same axially and rotatively between a plurality of axial and rotative positions thereof, said power drive means being arranged to rotate said shaft in either of opposite rotative directions independently of the axial position of said shaft, said control means comprising a bearing means for said lever defined by bearing surface members in sliding engagement with a sliding surface portion of said lever, said bearing surface members being displaceable along respective radial axes and being resiliently urged along said axes into contact with said lever, said lever being shiftable in a first direction with its said sliding surface portion sliding in said bearing surface members whereby said shaft is shifted axially, and said lever being shiftable in a second direction transverse to the first direction whereby said shaft is shifted rotatively and whereby opposite ones of said bearing surface members are displaced in respective opposite radial directions, said bearing surface members being arranged to actuate said power drive means to rotatively drive said shaft.

2. The combination of claim 1, said power drive means comprising a double-acting pressure fluid cylinder having an axially reciprocable piston therein which is connected to said shaft for rotating same in either of opposite directions in correspondence to the direction in which said piston moves in said cylinder, said control means further comprising a distributor for connecting either end of said cylinder to a fluid pressure source while simultaneously connecting the opposite end to exhaust, said bearing members being arranged to actuate said distributor.

3. The combination of claim 1, said lever sliding surface portion comprising a ball-shaped portion and said bearing surface members being correspondingly contoured.

4. The combination of claim 1, said control means comprising a push rod extending radially from each said bearing surface member with one end thereof abutting against the back of a bearing surface member and an opposite end abutting against a pivoted member at a point thereon eccentric to the pivot axis thereof, an arm extending radially from each pivoted member, each said arm being arranged to actuate said power drive means, resilient means acting upon said arms thereby urging them to turn said pivoted members in a direction opposite to that in which said pivoted members can be turned by radially outward displacement of said bearing members and the push rods associated therewith.

References Cited

UNITED STATES PATENTS

| | | | |
|---|---|---|---|
| 2,201,970 | 5/1940 | Hey | 74—335 |
| 2,215,423 | 9/1940 | Heftler et al. | 74—335 |
| 2,289,655 | 7/1942 | Kesling | 74—335 |
| 2,487,116 | 11/1949 | Eaton | 74—335 XR |
| 3,074,291 | 1/1963 | Alfieri | 74—335 |

HALL C. COE, Primary Examiner

U.S. Cl. X.R.

74—335